UNITED STATES PATENT OFFICE.

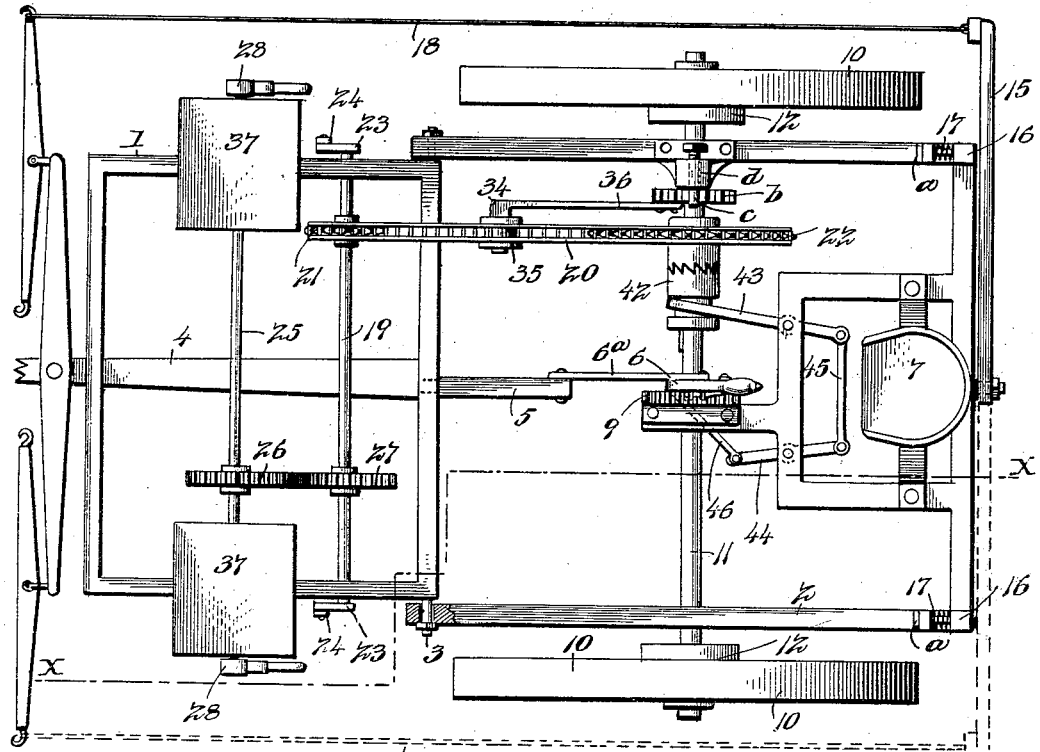

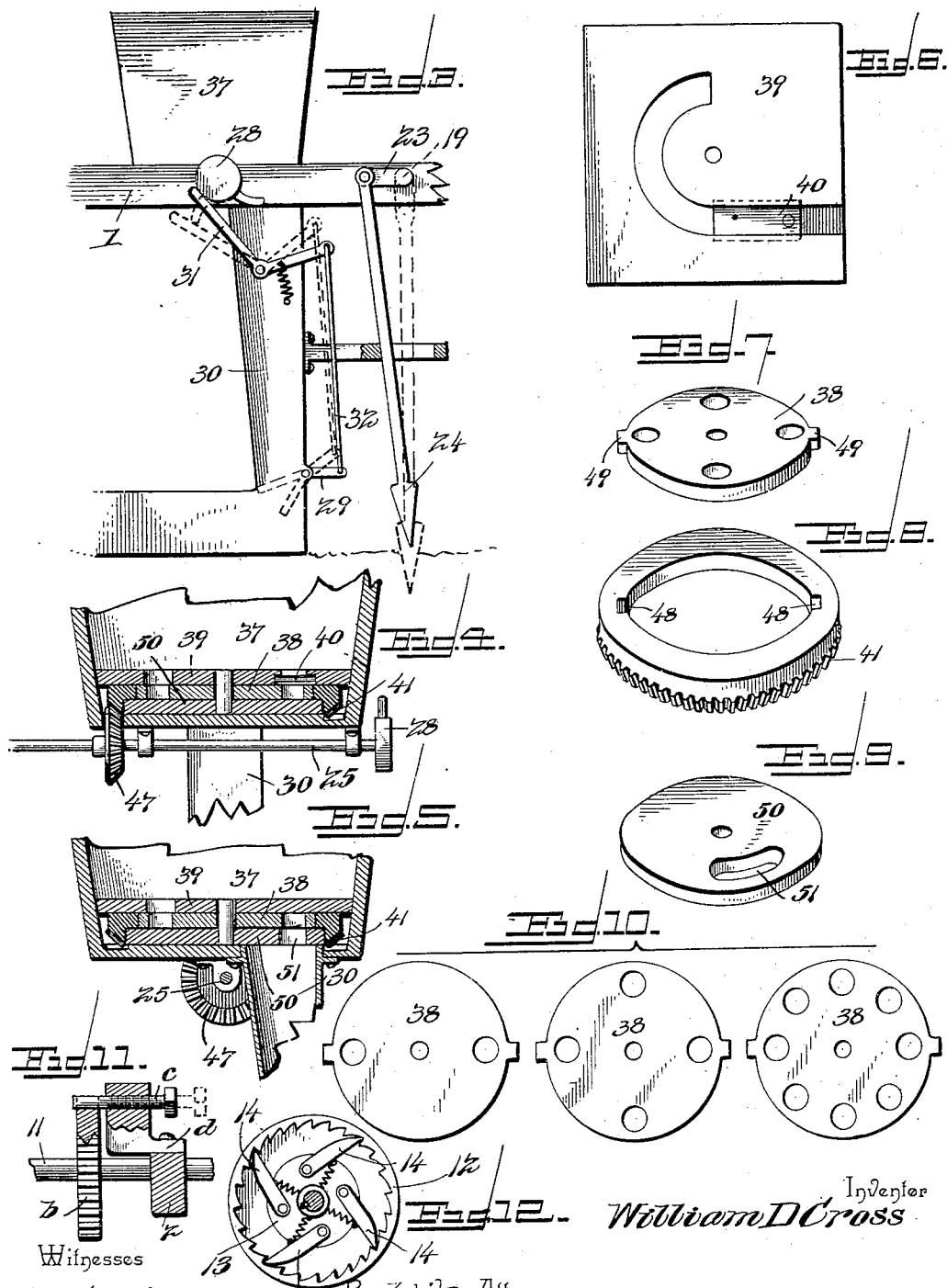

WILLIAM D. CROSS, OF CLIMAX, KANSAS.

CORN-PLANTER.

SPECIFICATION forming part of Letters Patent No. 602,554, dated April 19, 1898.

Application filed July 7, 1897. Serial No. 643,721. (No model.)

*To all whom it may concern:*

Be it known that I, WILLIAM D. CROSS, a citizen of the United States, residing at Climax, in the county of Greenwood and State of Kansas, have invented a new and useful Corn-Planter, of which the following is a specification.

This invention relates to planters designed for dropping seed in check-rows or drills, as required, according to the nature of the grain to be planted and the character of soil for the reception thereof.

An important feature of the invention is the ease with which the dropping-plates can be replaced to adapt the machine to the particular kind of planting to be performed and to have the machine under the control of the driver at all times, whereby the runner-frame may be caused to run deep or shallow and the same lever employed for this purpose made to answer for throwing the seeding mechanism into and out of gear.

A still further purpose of the improvement is to increase the efficiency of this class of machines without adding to the cost or the number of working parts and to have the latter disposed so as to be within reach and under observation at all times, whereby repairs may be quickly effected, obstructing matter easily removed, and the parts lubricated to secure easy running and a light draft.

Other objects and advantages are contemplated and will appear in the course of the subjoined description, in which corresponding and like parts are referred to by the same reference characters and similarly indicated in all the views of the drawings.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a planter constructed in accordance with the principles of this invention. Fig. 2 is a longitudinal section on the line X X of Fig. 1. Fig. 3 is a detail view of the marking and planting mechanisms. Fig. 4 is a sectional detail of the lower portion of the hopper. Fig. 5 is a view similar to Fig. 4, taken at right angles thereto. Fig. 6 is a top plan view of the cap-plate for covering the seeding mechanism. Fig. 7 is a detail view of a seed disk or plate. Fig. 8 is a detail view of a bevel gear-ring to which the seed-disks are removably and interchangeably fitted. Fig. 9 is a detail view of the plate upon which the gear-ring rotates. Fig. 10 shows some of the different forms of seed-dropping plates. Fig. 11 is a detail view of the securing means for the chain-tightener. Fig. 12 is a detail view of the clutch between the ground-wheels and the axle.

The runner-frame 1 is of rectangular form and has loose connection with the wheel-frame 2 to admit of the frames moving relatively to adapt themselves to the surface condition of the ground over which the machine is drawn. Any means may be employed for connecting the frames so as to attain the desired end, and, as shown, pins 3 project laterally from the rear end of the runner-frame and operate loosely in openings formed in the front end of the wheel-frame, thereby admitting of the frames moving vertically at their free ends independently of each other. The pole or tongue 4 is secured to the runner-frame and the team is hitched thereto in the usual way when it is required to draw the machine over the field. A bar 5 is secured to the runner-frame and projects in the rear thereof, and a link 6ª connects it with a lever 6, by means of which the runner-frame is moved to cause the planting to be effected deep or shallow, as may be required, or to throw the runners out of action when turning the machine at the end of a row prior to recrossing the field. The lever 6 extends within convenient reach of the driver's seat 7 and is held in a located position by the usual hand-latch 8 and notched segment 9.

The ground-wheels 10 are mounted upon the axle 11, so as to turn loosely thereon, and a clutch is interposed between them and the axle to cause the parts to rotate in unison when the planter is drawn forward and to admit of the wheels running at unequal speed when turning the machine or when passing over rolling ground. The clutch between each ground-wheel and the axle may be of any of the usual forms generally employed in this connection and, as shown, consists of a ratchet-wheel 12, secured to the hub of each ground-wheel, and a disk 13, caused to revolve with the axle and bearing spring-actuated pawls 14, which engage with teeth of the ratchet-wheel 12 to effect the desired result.

The marker 15 for properly spacing the rows consists of a bar hinged at its inner end and provided at its extremity with a blade to trail upon the ground and is held up out of the way when not required for use by a post 16 and a spring-actuated catch 17, mounted upon a pin $a$, supported by the said post. A line or cord 18 connects the outer end of the marker arm or bar with the front portion of the machine and holds it in working position when the planter is in operation.

A shaft 19 is journaled transversely of the runner-frame and is operated from the axle 11 by means of a sprocket-chain 20 and sprocket-wheels 21 and 22, and is provided at its ends with cranks 23 for operating markers 24, which indicate the hills, so that the seeding mechanism may be properly timed to drop the seed in check-rows, which is desirable when planting corn. The markers 24 receive a combined vertical reciprocating and oscillatory movement as the planter is advanced over the field and indent the soil, so as to designate the place where the seed is deposited. Each marker is directed in its movements by a guide or slotted arm extending rearwardly from the contiguous grain-spout. A second shaft 25 is journaled upon the runner-frame about parallel with the shaft 19 and receives motion therefrom by intermeshing gears 26 and 27, and is provided at its ends with trips 28 for actuating the valves 29 at the lower ends of the grain-spouts 30, through the instrumentality of levers 31 and links 32, between the parts 31 and the arms of the valves 29. A uniform tension is maintained upon the sprocket-chain 20 by means of a tightener or compensator 34, consisting of a wheel 35, disposed to bear against a portion of the sprocket-chain, and a spring-arm 36, secured at its rear end to a toothed plate or disk $b$, mounted upon the axle 11, so as to turn thereon. A pin or screw-stop $c$ is mounted in a bracket $d$, secured to a side bar of the frame, and is adapted to engage with the teeth of the plate or disk and hold it in the required position.

A hopper 37 is provided at each side of the runner-frame above the grain-spout, and its bottom is formed with a discharge-opening through which the grain passes into the grain-spout communicating therewith in the operation of the seeding mechanism. A plate or disk 38 is rotatably mounted upon the bottom of each hopper and will be provided with one or more openings, according as the grain is to be planted in check-rows or drills, and these seed-dropping plates 38 are fitted to gear-rings 41, applied to the hopper-bottoms in such a manner as to be readily removed to enable the proper plate to be placed in position, according to the work to be performed. The dropping-plates 38 are protected by cap-plates 39, having openings in which operate springs 40 to insure a proper discharge of the grain. The dropping-plates 38 are rotated in the ordinary manner by intermeshing gearing between them and the shaft 25, the latter being provided with bevel-gears 47, which mesh with corresponding cog-gearing formed on the rings 41. The seed-plates and gear-rings interlock, so as to revolve together, any means being resorted to to effect this result. As shown, the rings have notches 48, and the seed-plates have lugs 49 to fit within the notches 48. A circular plate 50 is secured upon the hopper-bottom and has an opening 51, corresponding with the discharge-opening thereof, and the gear-ring is countersunk at its inner lower edge to receive the edge portion of the plate 50, which holds it in place.

The seeding mechanism is adapted to be thrown into and out of gear, and for this purpose a clutch 42 is interposed between the sprocket-wheel 22 and the axle 11, the sprocket-wheel 22 being loosely mounted upon the axle and formed on one side with a half-clutch, and the complementary part of the clutch being mounted upon the axle so as to move thereon but turn therewith, whereby when the members of the clutch are in engagement the axle and sprocket-wheel 22 will rotate as one part. A lever 43 has one end in engagement with the movable clutch member and is connected with a corresponding lever 44 by means of a rod 45, and said lever 44 has connection with the lever 6 by means of a rod 46, whereby the seeding mechanism may be thrown out of gear simultaneously with the elevating of the runner-frame, as will be readily understood.

Having thus described the invention, what is claimed as new is—

1. In a planter, the combination with the runner and wheel frames pivotally connected, the runner-frame having a rear extension, a planting mechanism, a vertical lever fulcrumed upon the wheel-frame and having its lower end extended below the fulcrum, a rod connecting the upper end of the lever with the said rear extension of the runner-frame, and a clutch for throwing the planting mechanism into and out of gear, of a longitudinal lever having one end in direct engagement with the said clutch, a second longitudinal lever having one end connected with the other end of the clutch-lever, and a rod connecting the said second longitudinal lever at its opposite end with the lower end of the aforedescribed vertical lever, substantially as and for the purpose set forth.

2. In a planter, the combination of transversely-alining hoppers, a seed-dropping mechanism in each hopper, a shaft mounted in line with and below the hoppers and having direct connection with the seed-dropping mechanism of each and having its ends extended, trips applied to the extended ends of the shaft, valves at the lower ends of the grain-spouts having rearwardly-extending arms, spring-actuated bell-crank levers fulcrumed to the grain-spouts and having one arm extending in the path of the trips to be actuated thereby, and links connecting the horizontal arms of the levers with the rearwardly-extending arms of the valves, substantially as set forth.

3. In a planter, the combination of the axle, a shaft parallel with the axle and in connection with the seed-dropping mechanism, gear-wheels upon the axle and shaft, a drive-chain connecting the said gear-wheels, a toothed segment mounted concentric with the axle, an arm secured to the said segment and bearing a roller which is brought forcibly into contact with a portion of the drive-chain to maintain a proper tension thereon, and a stop mounted in a bracket of the frame and adapted to engage with the toothed segment to hold the arm in an adjusted position, substantially as set forth.

In testimony that I claim the foregoing as my own I have hereto affixed my signature in the presence of two witnesses.

WILLIAM D. CROSS.

Witnesses:
R. A. CROSS,
N. P. MORGAN.